US012353096B2

(12) United States Patent
Date et al.

(10) Patent No.: US 12,353,096 B2
(45) Date of Patent: Jul. 8, 2025

(54) DISPLAY DEVICE

(71) Applicant: Sharp Display Technology Corporation, Kameyama (JP)

(72) Inventors: Masahiro Date, Kameyama (JP); Kazuhide Akita, Kameyama (JP); Eiji Shinohara, Kameyama (JP); Shota Nozaki, Kameyama (JP); Tadashi Okamoto, Kameyama (JP); Kazuyoshi Hamanaka, Kameyama (JP); Hiroto Akiyama, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 404 days.

(21) Appl. No.: 18/114,225

(22) Filed: Feb. 25, 2023

(65) Prior Publication Data

US 2023/0305342 A1    Sep. 28, 2023

(30) Foreign Application Priority Data

Mar. 24, 2022 (JP) .................................. 2022-048450

(51) Int. Cl.
*G02F 1/1339* (2006.01)
*G02F 1/1335* (2006.01)
(52) U.S. Cl.
CPC .... *G02F 1/13394* (2013.01); *G02F 1/133512* (2013.01); *G02F 1/133514* (2013.01); *G02F 1/13396* (2021.01)

(58) Field of Classification Search
CPC ........... G02F 1/13394; G02F 1/133512; G02F 1/133514; G02F 1/13396; G02F 2201/56
See application file for complete search history.

(56) References Cited

U.S. PATENT DOCUMENTS

| 10,074,670 | B2 * | 9/2018 | Itou ...................... H10D 86/441 |
| 10,338,714 | B2 * | 7/2019 | Hirosawa .......... G02F 1/134309 |
| 2009/0309813 | A1 | 12/2009 | Fujita |

FOREIGN PATENT DOCUMENTS

JP    2009300556 A    12/2009

\* cited by examiner

*Primary Examiner* — Tuyen Tra
(74) *Attorney, Agent, or Firm* — ScienBiziP, P.C.

(57) ABSTRACT

A display device includes: a plurality of first color filters not intersecting a non-linear portion with at least a part of an outer shape of a display region being non-linear, a plurality of second color filters at least part of which intersects the non-linear portion, a first region with the plurality of first color filters disposed, a second region with the plurality of second color filters disposed, a first light blocking portion partitioning the plurality of first color filters, a second light blocking portion partitioning the plurality of second color filters, and a spacer. An overlapping area of the second light blocking portion with respect to the plurality of second color filters is larger than that of the first light blocking portion with respect to the plurality of first color filters. A distribution density of the spacer in the second region is lower than that in the first region.

4 Claims, 9 Drawing Sheets

DISPLAY DEVICE

CROSS-REFERENCE TO RELATED APPLICATIONS

This application claims the benefit of priority to Japanese Patent Application Number 2022-048450 filed on Mar. 24, 2022. The entire contents of the above-identified application are hereby incorporated by reference.

BACKGROUND

Technical Field

The technique disclosed in the present specification relates to a display device.

As an example of a liquid crystal display device in the related art, there is known a liquid crystal display device described in JP 2009-300556 A. The liquid crystal display device described in JP 2009-300556 A includes a display region having a non-rectangular shape, a frame region surrounding the display region, a plurality of picture elements arranged in the display region, and effective display regions of a plurality of colors provided in the plurality of picture elements. Each of the effective display regions of the plurality of colors provided in a picture element located at the boundary portion (display area end) of the display region has the same aperture ratio in one picture element, and is formed such that a center line in a second direction (vertical direction) perpendicular to a first direction (horizontal direction) in which each color of the effective display regions of the plurality of colors are arranged is located on an extension line of a center line of the effective display regions provided in the picture elements adjacent to each other in the first direction.

SUMMARY

The liquid crystal display device described in JP 2009-300556 A includes, as the picture elements, normal picture elements located at positions other than a display area end, and aperture ratio adjustment picture elements and non-lighting picture elements located at the display area end. An aperture ratio of each picture element decreases in the order of the normal picture element, the aperture ratio adjustment picture element, and the non-lighting picture element. The aperture ratio of each picture element is adjusted by a formation range of a black matrix. Note that the picture element is constituted by an effective display region which is an opening of the black matrix, and a color filter is formed so as to fill the opening.

The liquid crystal display device described in JP 2009-300556 A is constituted by disposing an array substrate and a counter substrate so as to face each other, bonding them together, and sealing liquid crystal therebetween. In order to maintain a cell gap between the array substrate and the counter substrate, a spacer is generally provided on the counter substrate. In the liquid crystal display device described in JP 2009-300556 A, in order to adjust the aperture ratio of each picture element, the black matrix disposed at the display area end has a wider formation range as compared with the black matrix disposed at a position other than the display area end. At the display area end, the film thickness of the color filter may be increased due to the wide formation range of the black matrix. Thus, the spacer disposed at the display area end is higher, by an amount of larger film thickness of the color filter, as compared with the spacer disposed at the position other than the display area end. Then, when an external force acts on either of the both substrates, the spacer disposed at the display area end is likely to be rubbed against an alignment film disposed on an inner face of the array substrate, and as a result, shavings of the alignment film may be likely to be generated. When the shavings of the alignment film are generated, a display defect such as a bright spot defect may be generated at the display area end.

The techniques described in the present specification is made based on the above-described circumstances, and an object thereof is to make the display defect less likely to be generated.

(1) A display device according to the techniques described in the present specification includes a first substrate, a second substrate facing the first substrate with an interval therebetween, a plurality of color filters that are provided on the first substrate and exhibit different colors, a light blocking portion that is provided on the first substrate, partitions the plurality of color filters, overlaps at least with a portion of the plurality of color filters, and blocks light, and a spacer that is provided at least on the first substrate and protrudes from the first substrate toward the second substrate. A main surface of the first substrate and the second substrate is divided into a display region and a non-display region, the display region being with the plurality of color filters and the light blocking portion disposed and an image being displayed in the display region, the non-display region surrounding the display region and no image being displayed in the non-display region. The display region is a non-linear portion with at least a part of an outer shape being non-linear. The plurality of color filters include a plurality of first color filters not intersecting the non-linear portion and a plurality of second color filters, at least part of the plurality of second color filters intersecting the non-linear portion. The display region includes a first region with the plurality of first color filters disposed and a second region with the plurality of second color filters disposed. The light blocking portion includes a first light blocking portion that partitions the plurality of first color filters and a second light blocking portion that partitions the plurality of second color filters. An overlapping area of the second light blocking portion with respect to the plurality of second color filters is larger than an overlapping area of the first light blocking portion with respect to the plurality of first color filters. A distribution density of the spacer in the second region is lower than a distribution density of the spacer in the first region.

(2) In the above-described display device, in addition to (1), the plurality of second color filters may include a plurality of third color filters and a plurality of fourth color filters having a smaller area in the display region than the plurality of third color filters. The second light blocking portion may include a third light blocking portion that partitions the plurality of third color filters and a fourth light blocking portion that partitions the plurality of fourth color filters. An overlapping area of the fourth light blocking portion with respect to the plurality of fourth color filters may be larger than an overlapping area of the third light blocking portion with respect to the plurality of third color filters.

(3) In the above-described display device, in addition to (2), the second region may include a third region with the plurality of third color filters disposed and a fourth region with the plurality of fourth color filters disposed.

The plurality of third color filters may have an area not overlapping with the third light blocking portion, and the ratio of the area to a total area may exceed 35%. The plurality of fourth color filters may have an area not overlapping with the fourth light blocking portion, and the ratio of the area to the total area may be 35% or less. The spacer may exist in the third region but need not exist in the fourth region.

(4) In the above-described display device, in addition to any one of (1) to (3), the plurality of color filters may be arranged side by side in a first direction along the main surface of the first substrate, and the second light blocking portion may include an overlapping portion overlapping with a center portion of the plurality of second color filters in a second direction along the main surface of the first substrate and orthogonal to the first direction.

According to the techniques described in the present specification, a display defect can be less likely to be generated.

BRIEF DESCRIPTION OF DRAWINGS

The disclosure will be described with reference to the accompanying drawings, wherein like numbers reference like elements.

DESCRIPTION OF EMBODIMENTS

First Embodiment

The first embodiment will be described with reference to FIGS. 1 to 9. In the present embodiment, a liquid crystal panel (display panel) 10 is exemplified. Note that an X-axis, a Y-axis, and a Z-axis are illustrated in part of each drawing, and each axial direction is illustrated to represent a direction in each drawing.

Figure 1:
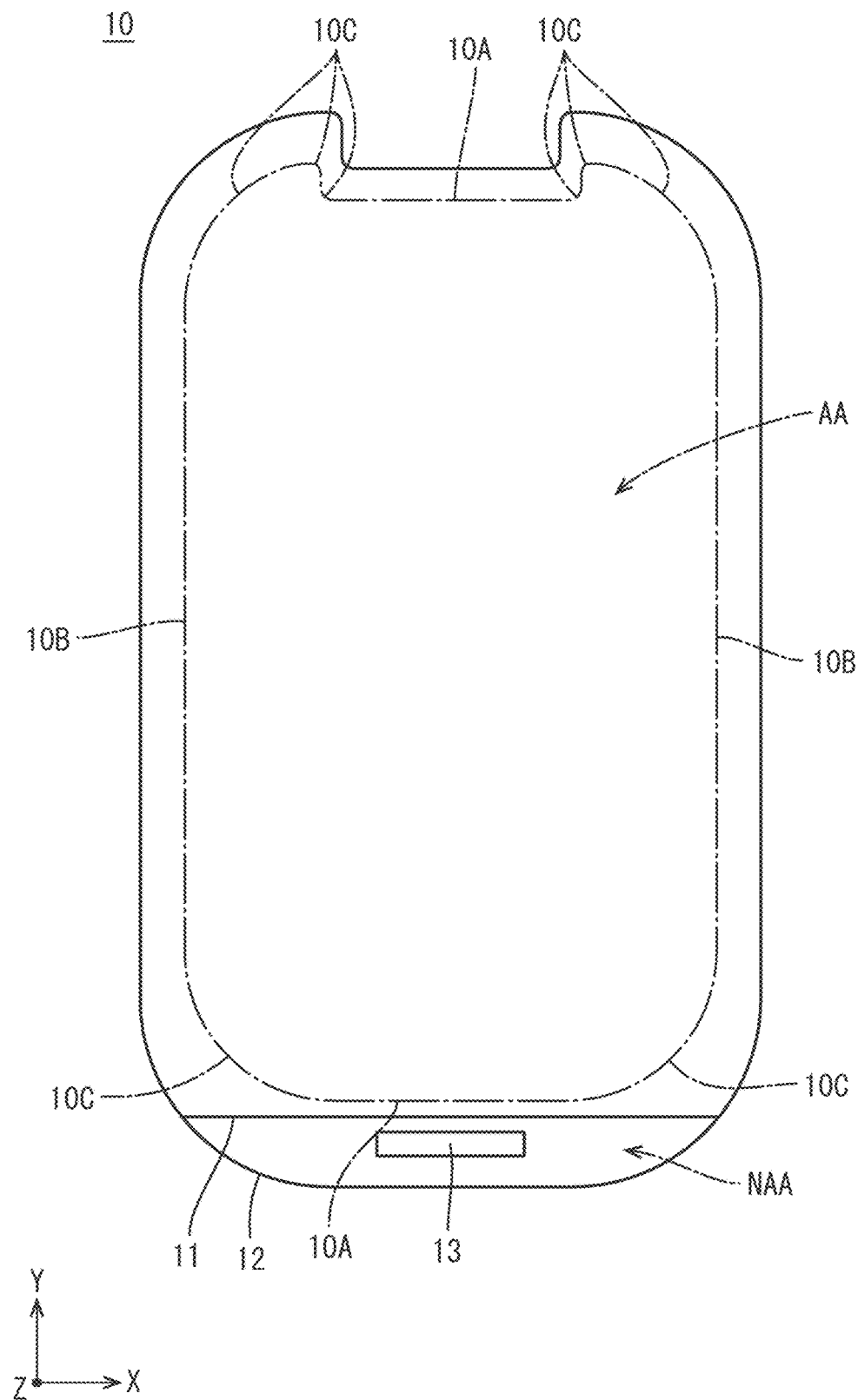
FIG. 1 is a plan view of a liquid crystal panel according to a first embodiment.

As illustrated in FIG. 1, the liquid crystal panel 10 according to the present embodiment has a planar shape as a whole in a vertically long substantially square shape, and each of the four corners has a rounded shape. FIG. 1 is a plan view of the liquid crystal panel 10. The liquid crystal panel 10 having such a planar shape is preferably used for a portable information terminal such as a smartphone, which is not necessarily limited thereto. A short-side direction, a long-side direction, and a plate-thickness direction (normal direction of a main surface) of the liquid crystal panel 10 match an X-axis direction, a Y-axis direction, and a Z-axis direction, respectively. A center portion of the liquid crystal panel 10 in the X-axis direction, which is an upper end portion in FIG. 1, is cut out in order to secure an installation space for a camera or the like mounted on the portable information terminal. Thus, the liquid crystal panel 10 has an outer shape in which an upper end center portion in FIG. 1 is recessed. The liquid crystal panel 10 can display an image by using illumination light emitted from a backlight device (illumination device).

As illustrated in FIG. 1, the center-side portion of the main surface of the liquid crystal panel 10 is a display region AA in which images are displayed. In the display region AA, the outer shape is a planar shape following the outer shape of the liquid crystal panel 10, that is, the display region AA has a vertically long substantially square shape with rounded corners in a plan view, and the upper end center portion in FIG. 1 has a recessed outer shape. The outer shape of the display region AA is a non-rectangular shape. The outer shape of the display region AA includes first linear portions 10A having a linear shape along the X-axis direction, second linear portions 10B having a linear shape along the Y-axis direction, and non-linear portions 10C having a non-linear shape. Two first linear portions 10A are disposed at the center of the outer shape of the display region AA in the X-axis direction above and below in FIG. 1. Regarding the second linear portions 10B, two are disposed at left and right ends of the outer shape of the display region AA in the X-axis direction, and another two are disposed in the recessed portion. Regarding the non-linear portions 10C, four are disposed at the four corners of the outer shape of the display region AA, and another four are disposed at respective both ends of the two second linear portions 10B in the recessed portion. Each of the non-linear portions 10C is a curved line. Specifically, each of the non-linear portions 10C has a substantially arc shape in a plan view.

As illustrated in FIG. 1, in the liquid crystal panel 10, a frame-shaped outer peripheral portion surrounding the display region AA of the main surface is a non-display region NAA in which no image is displayed. Note that a range surrounded by an alternating dotted-dashed line in FIG. 1 is the display region AA. A driver 13 and a flexible substrate are mounted on the liquid crystal panel 10. The driver 13 is constituted by an LSI chip having a drive circuit therein. The driver 13 is chip-on-glass (COG) mounted to the liquid crystal panel 10, and processes various signals transmitted by the flexible substrate.

Figure 2:
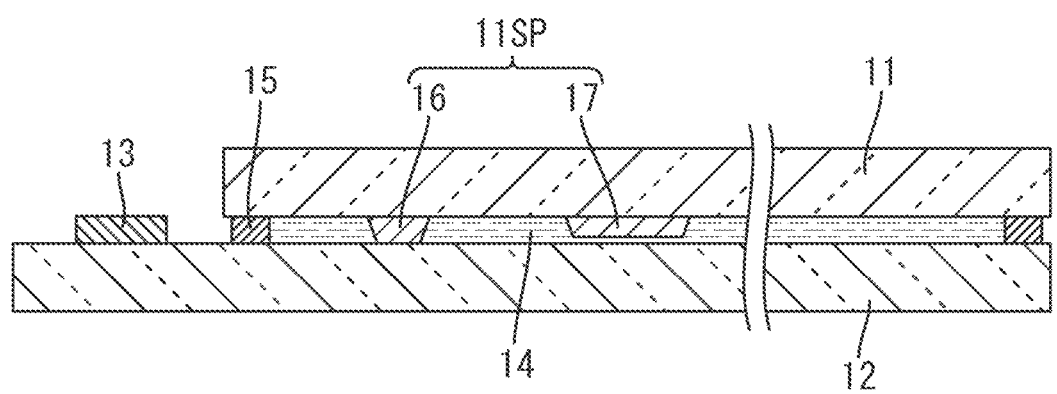
FIG. 2 is a cross-sectional view of the liquid crystal panel.
Figure 2:
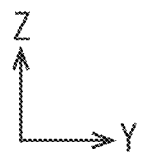

As illustrated in FIG. 2, the liquid crystal panel 10 includes a pair of substrates 11 and 12 that have main surfaces facing each other with an interval therebetween, and a liquid crystal layer (medium layer) 14 filling the internal space between the pair of substrates 11 and 12. Of the pair of substrates 11 and 12, one disposed on a front side is a counter substrate (first substrate) 11, and the other one disposed on a back side is an array substrate (second substrate, active matrix substrate) 12. The counter substrate 11 and the array substrate 12 are both made of, for example, glass. The array substrate 12 has the long-side dimension is larger than that of the counter substrate 11. One end portion of the array substrate 12 in the long-side direction does not overlap the counter substrate 11, and the above-described driver 13 and flexible substrate are mounted to the one end portion.

The liquid crystal layer 14 includes liquid crystal molecules that are a substance having optical characteristics changing according to an applied electric field. As illustrated in FIG. 2, the liquid crystal layer 14 is sealed by a sealing portion 15 surrounding the internal space between the pair of substrates 11 and 12. The sealing portion 15 is formed to surround the entire circumference of the internal space between both the substrates 11 and 12 in the non-display region NAA. The planar shape of the sealing portion 15 is a shape following the outer shape of the liquid crystal panel 10. A spacer 11SP that protrudes toward the array substrate 12 is provided on the inner face of the counter substrate 11. The spacer 11SP can maintain an interval between the pair of substrates 11 and 12, that is, a cell gap. The spacer 11SP includes a main spacer 16 and a sub-spacer 17. The main spacer 16 has a protrusion dimension larger than that of the sub-spacer 17, and is in contact with the inner face of the array substrate 12 at all times. The sub-spacer 17 has a protrusion dimension smaller than that of the main spacer 16, and is not always in contact with the inner face of the array substrate 12, but is in contact with the inner face of the array substrate 12 when an external force is applied to the counter substrate 11 and/or the array substrate 12. A pair of polarizers are bonded to the outer faces of the pair of substrates 11 and 12.

Figure 3:
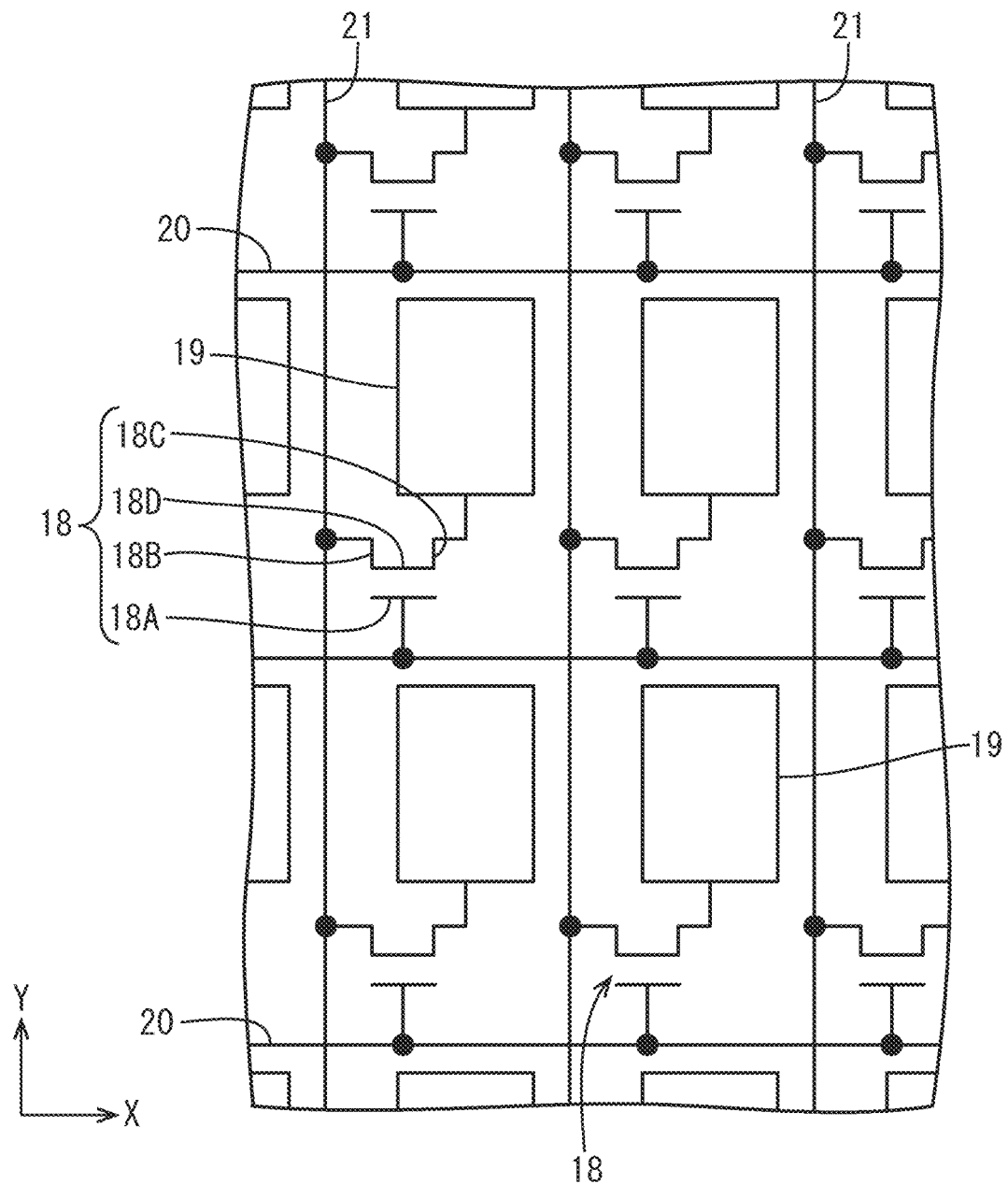
FIG. 3 is a circuit diagram illustrating a pixel arrangement in a display region of an array substrate provided in the liquid crystal panel.

Subsequently, a pixel arrangement in the display region AA of the array substrate 12 will be described with reference to FIG. 3. A plurality of gate wiring lines (scanning wiring lines) 20 and a plurality of source wiring lines (image wiring lines) 21 forming a lattice pattern are disposed on the inner face side of the display region AA of the array substrate 12 as illustrated in FIG. 3. Thin film transistors (TFTs) 18 and pixel electrodes 19 are provided at or near the intersection points between the gate wiring lines 20 and the source wiring lines 21. Each of the gate wiring lines 20 extends substantially in the X-axis direction to cross the display region AA, and is connected to a gate electrode 18A of each TFT 18. The plurality of gate wiring lines 20 are arranged side by side at intervals in the Y-axis direction. Each of the source wiring lines 21 extends substantially in the Y-axis direction to cross the display region AA, and is connected to a source electrode 18B of each TFT 18. The plurality of source wiring lines 21 are disposed at intervals in the X-axis direction. Each of the gate wiring lines 20 and each of the source wiring lines 21 intersect each other, but are insulated from each other by an insulating film interposed therebetween. A plurality of the TFTs 18 and a plurality of the pixel electrodes 19 are regularly arranged side by side in a plane in a matrix shape in the X-axis direction and the Y-axis direction. Each of the pixel electrodes 19 is connected to a drain electrode 18C of a respective one of the TFTs 18. Each of the pixel electrode 19 is made of a transparent electrode material such as indium tin oxide (ITO). Each TFT 18 includes a semiconductor portion 18D in addition to the above-described gate electrode 18A, source electrode 18B, and drain electrode 18C. The semiconductor portion 18D is made of a semiconductor material and connected to the source electrode 18B and the drain electrode 18C. When each TFT 18 is driven based on a scanning signal supplied to a respective one of the gate wiring lines 20, the TFT 18 charges a respective one of the pixel electrodes 19 to a potential based on an image signal (a data signal) supplied to a respective one of the source wiring lines 21.

Figure 4:
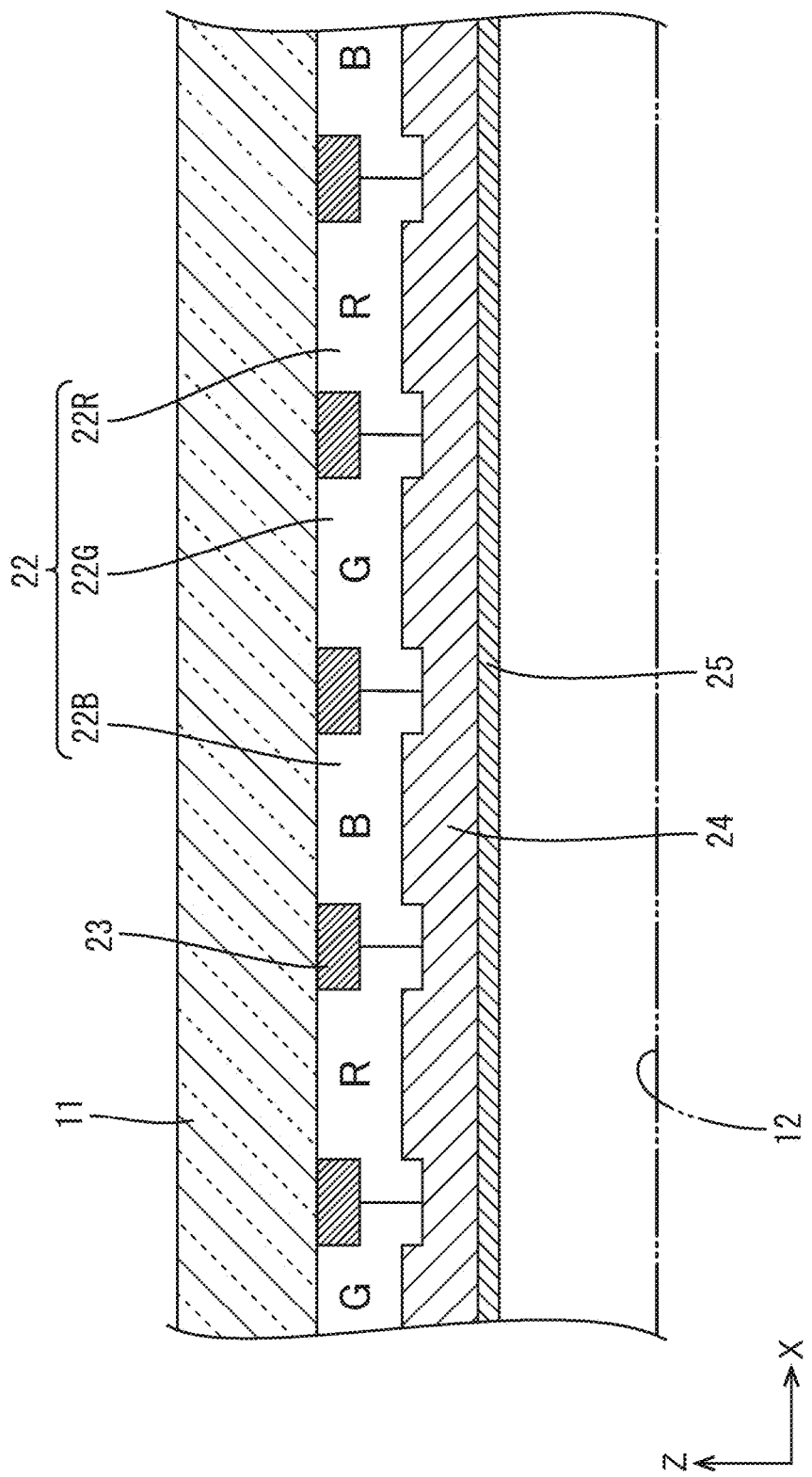
FIG. 4 is a cross-sectional view illustrating a pixel arrangement in a display region of a counter substrate provided in the liquid crystal panel.
Figure 5:
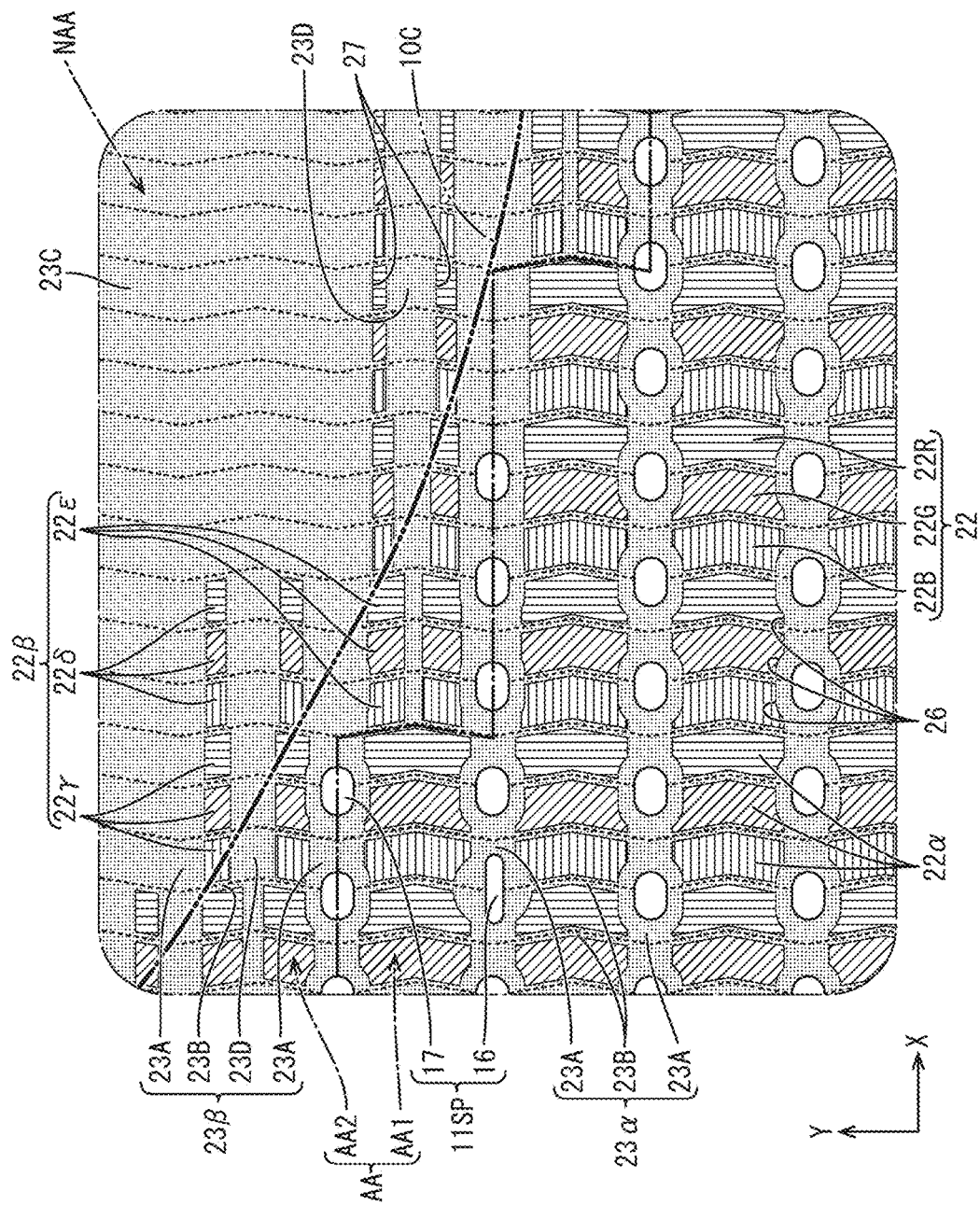
FIG. 5 is a plan view illustrating a configuration at or near a non-linear portion in the display region of the counter substrate.

A pixel arrangement in the display region AA of the counter substrate 11 will be described with reference to FIG. 4. As illustrated in FIG. 4, color filters 22 and a light blocking portion (a black matrix) 23 are provided on the inner face side of the counter substrate 11 in the display region AA, in addition to the main spacer 16 and the sub-spacer 17 described above. Note that in FIG. 4, the inner face of the array substrate 12 is indicated by a two dots-dashed line. First, the color filters 22 will be described. The color filters 22 includes a plurality of types exhibiting different colors. In FIG. 5, the color filters 22 are illustrated in shaded patterns different for respective exhibiting colors. The plurality of color filters 22 exhibiting different colors are arranged side by side so as to be adjacent to each other in the X-axis direction (an extending direction of the gate wiring lines 20). The plurality of color filters 22 exhibiting different colors extend substantially in the Y-axis direction (an extending direction of the source wiring lines 21). Specifically, the plurality of color filters 22 are repeatedly bent in the middle to form zigzag shapes in a plan view (see FIG. 5). In this manner, the plurality of color filters 22 exhibiting different colors are arranged in a stripe shape as a whole. Note that the plurality of color filters 22 exhibiting different colors are disposed such that the boundaries (color boundaries) therebetween overlap with the source wiring lines 21 of the array substrate 12.

To be specific, the color filters 22 include a green color filter 22G exhibiting green, a blue color filter 22B exhibiting blue, and a red color filter 22R exhibiting red. The green color filter 22G selectively transmits green light having a wavelength included in a green wavelength region (from approximately 500 nm to approximately 570 nm). The green color filter 22G has the highest relative luminous efficiency. The blue color filter 22B selectively transmits blue light included in a blue wavelength region (from approximately 400 nm to approximately 500 nm). The blue color filter 22B has the lowest relative luminous efficiency. The red color filter 22R selectively transmits red light having a wavelength included in a red wavelength region (from approximately 600 nm to approximately 780 nm). The red color filter 22R has relative luminous efficiency lower than that of the green color filter 22G but higher than that of the blue color filter 22B. The color filters 22 according to the present embodiment are in an array in which the blue color filter 22B, the green color filter 22G, and the red color filter 22R are repeatedly arranged in this order from the left in FIG. 4. In the liquid crystal panel 10, the color filters 22B, 22G, and 22R and three pixel electrodes 19 facing the color filters 22B, 22G, and 22R constitute pixels of three colors, the color filters 22B, 22G, and 22R sequentially aligned in the X-axis direction and exhibiting blue, green, and red colors, respectively. Then, in the liquid crystal panel 10, a display pixel capable of color display with predetermined gray scale is constituted by the pixels of three colors of red, green, and blue sequentially aligned in the X-axis direction. Note that an array pitch (length of the pixel) of the pixels in the Y-axis direction is approximately three times an array pitch (width of the pixel) thereof in the X-axis direction. A plurality of the pixels aligned along the X-axis direction constitute one pixel row, and a plurality of the pixels aligned along the Y-axis direction constitute one pixel column.

The light blocking portion 23 will be described with reference to FIG. 5 in addition to FIG. 4. The light blocking portion 23 is formed of a light blocking material having light blocking properties (for example, a material containing a pigment such as a carbon black in a photosensitive resin material such as an acrylic or polyimide). The light blocking portion 23 can block light emitted from a backlight device or the like. As illustrated in FIGS. 4 and 5, the light blocking portion 23 has a planar shape in a substantially lattice pattern in the display region AA. The light blocking portion 23 partitions pixel electrodes 19 adjacent to each other in the X-axis direction and the Y-axis direction. The light blocking portion 23 is disposed to overlap at least with the gate wiring lines 20 and the source wiring lines 21 on the array substrate 12 side in a plan view. The light blocking portion 23 includes first extending portions 23A that extend in the X-axis direction, and second extending portions 23B that extend substantially in the Y-axis direction and intersect the first extending portion 23A. Each of the first extending portions 23A partitions two pixel electrodes 19 adjacent to each other in the Y-axis direction. The number of the first extending portions 23A installed matches the number of the gate wiring lines 20 installed. Each of the first extending portions 23A is wider than each of the second extending portions 23B. Each of the first extending portions 23A is disposed to overlap at least with a respective one of the TFTs 18 and a respective one of the gate wiring lines 20. Each of the second extending portions 23B partitions two pixel electrodes 19 (color filters 22) adjacent to each other in the X-axis direction. The number of the second extending portions 23B installed matches the number of the source wiring lines 21 installed. Each of the second extending portion 23B is narrower than each of the first extending portion 23A. Each of the second extending portions 23B is disposed to overlap at least with a respective one of the source wiring lines 21. The mutual intersection points between the first extending portions 23A and the second extending portions 23B are continuous with each other. In the counter substrate 11, an overcoat film 24 for flattening disposed in a solid-like form over substantially the entire region of the counter substrate 11 is provided on the upper-layer side (the liquid crystal layer 14 side, the array substrate 12 side) of the color filters 22. In the counter substrate 11, an alignment film 25 for aligning the liquid crystal molecules contained in the liquid crystal layer 14 is provided on the upper-layer side of the overcoat film 24. Note that a similar alignment film is also provided on the innermost face of the array substrate 12. Both alignment films 25 are photo-alignment films that allow an alignment regulating force to be imparted to the liquid crystal molecules by light photo-alignment treatment being performed on the surface thereof.

A configuration at or near each of the non-linear portions 10C in the display region AA of the counter substrate 11 will be described with reference to FIG. 5. In FIG. 5, the color filters 22B, 22G, and 22R of the three colors are illustrated in different shaded patterns, and the light blocking portion 23 is illustrated in a different shaded pattern from that of each of the color filters 22B, 22G, and 22R. Note that in FIG. 5, the non-linear portion 10C is indicated by a two dots-dashed line. First, as illustrated in FIG. 5, the light blocking portion 23 is provided across the display region AA and the non-display region NAA of the counter substrate 11. A portion of the light blocking portion 23 disposed in the non-display region NAA is referred to as an outer peripheral side light blocking portion 23C. The outer peripheral side light blocking portion 23C is disposed in a solid-like form over substantially the entire region in the non-display region NAA except for at or near the non-linear portion 10C. The spacer 11SP is disposed to overlap with each of the first extending portions 23A of the light blocking portion 23 disposed in the display region AA. The spacer 11SP is disposed at each of the intersection points between the first extending portions 23A and the second extending portions 23B. That is, the spacer 11SP is disposed at a position between two color filters 22 (pixel columns) adjacent to each other in the X-axis direction as well as at a position between two pixels (pixel electrodes 19) adjacent to each other in the Y-axis direction. Note that the number of the main spacers 16 installed included in the spacers 11SP is smaller than the number of the sub-spacers 17. A predetermined number of the main spacers 16 are disposed in a dispersed manner in a predetermined range of the display region AA. Most of ones disposed at the intersection points between the first extending portions 23A and the second extending portions 23B are the sub-spacers 17.

As illustrated in FIG. 5, the plurality of color filters 22 disposed at or near the non-linear portion 10C in the display region AA of the counter substrate 11 include a plurality of first color filters 22α not intersecting the non-linear portion 10C and a plurality of second color filters 22β intersecting the non-linear portion 10C. Specifically, each of the plurality of first color filters 22α includes three color filters 22B, 22G, and 22R that are continuously arranged side by side in the X-axis direction and exhibit blue, green, and red, respectively. None of the three color filters 22B, 22G, and 22R constituting each of the plurality of first color filters 22α intersects the non-linear portion 10C. Thus, the entire region of each of the plurality of first color filters 22α is disposed in the display region AA, and does not include a portion in the non-display region NAA. A plurality of sets of the three color filters 22B, 22G, and 22R constituting each of the plurality of first color filters 22α are disposed in the display region AA. A region in the display region AA in which the plurality of first color filters 22α are disposed is referred to as a first region AA1.

As illustrated in FIG. 5, each of the plurality of second color filters 22β includes three color filters 22B, 22G, and 22R that are continuously arranged side by side in the X-axis direction and exhibit blue, green, and red, respectively. At least one of the three color filters 22B, 22G, and 22R constituting each of the plurality of second color filters 22β intersects the non-linear portion 10C. Thus, among the plurality of second color filters 22β, a second color filter 22β having a relationship of intersecting the non-linear portion 10C includes a part (a portion closer to the inner side than the non-linear portion 10C) disposed in the display region AA, but includes the remaining part (a portion closer to the outer side than the non-linear portion 10C) disposed in the non-display region NAA. A plurality of sets of the three color filters 22B, 22G, and 22R constituting each of the plurality of second color filters 22β are disposed in the display region AA. A region in the display region AA in which the plurality of second color filters 22β are disposed is referred to as a second region AA2. Note that in FIG. 5, a line dividing the first region AA1 and the second region AA2 is indicated by a thin dot-dashed line.

The plurality of second color filters 22β may include a second color filter 22β having a relationship of not intersecting the non-linear portion 10C. Even when all of the plurality of second color filters 22β intersect the non-linear portion 10C, in most cases, a ratio of an area in the display region AA to an area in the non-display region NAA is different. For this reason, when the aperture ratio of the plurality of second color filters 22β is set to be the same as the aperture ratio of the plurality of first color filters 22α, the amount of transmitted light in the portion of the second color filters 22β in the non-display region NAA is excessive, which causes a problem that the display at or near the non-linear portion 10C does not become smooth.

In order to cope with this, the light blocking portion 23 disposed at or near the non-linear portion 10C in the display region AA of the counter substrate 11 is configured as follows. As illustrated in FIG. 5, the light blocking portion 23 includes a first light blocking portion 23α that partitions the plurality of first color filters 22α and a second light blocking portion 23β that partitions the plurality of second color filters 22β. The first light blocking portion 23α includes the first extending portions 23A and the second extending portions 23B described above. Specifically, the first light blocking portion 23α includes two first extending portions 23A that sandwich each of the plurality of first color filters 22α from both sides in the Y-axis direction, and four second extending portions 23B that individually sandwich the three color filters 22B, 22G, and 22R constituting each of the plurality of first color filters 22α in the X-axis direction. A region surrounded by each two first extending portions 23A and two second extending portions 23B included in the first light blocking portion 23α constitutes a first pixel opening 26 that exposes each first color filter 22α. A portion of the first color filter 22α, which is exposed in the first pixel opening 26, transmits light and constitutes a pixel together with the pixel electrode 19 that overlaps with the portion. The first pixel opening 26 has a vertically long shape in a plan view and is bent once in the middle thereof in the longitudinal direction. The first light blocking portion 23α defines three first pixel openings 26.

As illustrated in FIG. 5, the second light blocking portion 23β includes an overlapping portion 23D overlapping with a center portion of each of the second color filters 22β (pixels) in the Y-axis direction, in addition to the first extending portions 23A and the second extending portions 23B. Specifically, the second light blocking portion 23β includes two first extending portions 23A that sandwich each of the plurality of second color filters 22β from both sides in the Y-axis direction, four second extending portions 23B that individually sandwich the three color filters 22B, 22G, and 22R constituting each of the plurality of second color filters 22β in the X-axis direction, and three parts of overlapping portions 23D each of which crosses respective one of the three color filters 22B, 22G, and 22R constituting each of the plurality of second color filters 22β. The overlapping portion 23D extends in the X-axis direction and is continuous with the two second extending portions 23B that sandwich each of the second color filters 22β from both sides in the X-axis direction. The center position of the overlapping portion 23D in the Y-axis direction is disposed to coincide with the center position of each of the second color filters 22β (pixels) in the Y-axis direction. Two regions surrounded by each two first extending portions 23A and two second extending portions 23B and one overlapping portion 23D that are included in the second light blocking portion 23β constitute two second pixel openings 27 that expose each second color filter 22β. Portions of each of the second color filters 22β that are exposed in the two second pixel openings 27 transmit light and constitute a pixel together with the pixel electrode 19 that overlaps with the portions. The two second pixel openings 27 are disposed at an interval by an amount of the width size of the overlapping portion 23D in the Y-axis direction. Each of the two second pixel openings 27 has a planar shape of a substantially parallelogram. According to such a configuration, the overlapping area of the second light blocking portion 23β with respect to each of the second color filters 22β is larger than the overlapping area of the first light blocking portion 23α with respect to each of the first color filters 22α by an amount of the overlapping portion 23D. The second light blocking portion 23β defines six second pixel openings 27.

According to the above configuration, the aperture ratio of the plurality of second color filters 22β is lower than the aperture ratio of the plurality of first color filters 22α. Thus, the amount of transmitted light in the portion of the second color filters 22β in the non-display region NAA is reduced, and thus the display at or near the non-linear portion 10C can be smoothed.

Figure 6:
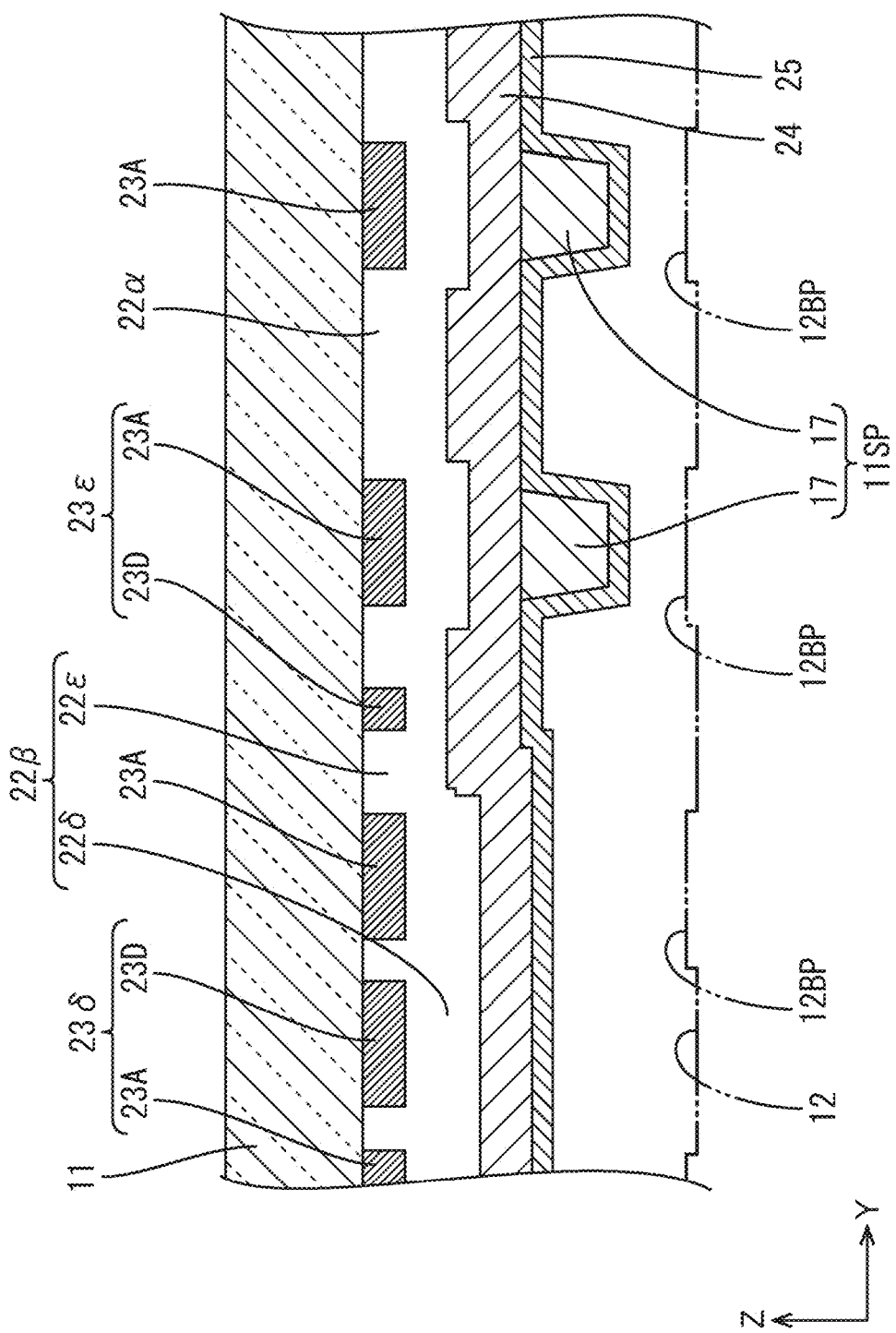
FIG. 6 is a cross-sectional view illustrating a cross-sectional configuration of a first color filter and a second color filter (a third color filter and a fourth color filter) provided on the counter substrate.

As described above, when the overlapping area of the second light blocking portion 23β with respect to each second color filter 22β is larger than the overlapping area of the first light blocking portion 23α with respect to each first color filter 22α, the film thickness of the second color filter 22β may be larger than the film thickness of the first color filter 22α, as illustrated in FIG. 6. When a spacer 11SP is disposed in the second region AA2 of the display region AA, the spacer 11SP is raised by the second color filter 22β having a larger film thickness, and thus the spacer 11SP is disposed closer to the array substrate 12 than the spacer 11SP disposed in the first region AA1. Thus, in the second region AA2, damage to the inner face of the array substrate 12, which is generated when the spacer 11SP interferes with the inner face of the array substrate 12, tends to increase. In the present embodiment, the second light blocking portion 23β includes the overlapping portion 23D, and thus the second pixel opening 27 of each second color filter 22β is divided into two. The width of the second pixel opening 27 is smaller as compared with a case where the second pixel opening is not divided. Thus, the film thickness of the second color filter 22β tends to be likely to further increase, and the damage to the inner face of the array substrate 12 in the second region AA2 tends to further increase. Note that in FIG. 6, the inner face of the array substrate 12 is indicated by a two dots-dashed line.

As illustrated in FIGS. 5 and 6, regarding the spacer 11SP according to the present embodiment, in the display region AA, the distribution density of the spacer 11SP in the second region AA2 is lower than the distribution density of the spacer 11SP in the first region AA1. To be specific, in the first region AA1, the spacer 11SP is disposed at every other intersection point among intersection points between one first extending portion 23A extending in the X-axis direction and the plurality of second extending portions 23B disposed at intervals in the X-axis direction. In other words, in the first region AA1, the spacer 11SP is disposed at the 2n-th or (2n−1)-th intersection point counted from the end in the X-axis direction among the plurality of intersection points aligned along the X-axis direction ("n" is a natural number). Thus, the number of spacers 11SP installed in the first region AA1 is about half of the total number of the intersection points between the first extending portions 23A and the second extending portions 23B in the first region AA1. On the other hand, the number of spacers 11SP installed in the second region AA2 is smaller than the half of the total number of the intersection points between the first extending portions 23A and the second extending portions 23B in the second region AA2. That is, the spacer 11SP is not disposed at intersection points, which can be the installation target of the spacer 11SP in the case of the first region AA1, among the plurality of intersection points in the second region AA2. Thus, the distribution density of the spacers 11SP in the second region AA2, which is defined by the number of the spacers 11SP installed per unit area of the second region AA2, is lower than the distribution density of the spacers 11SP in the first region AA1, which is defined by the number of the spacers 11SP installed per unit area of the first region AA1. With this configuration, even when the film thickness of the second color filter 22β is larger than the film thickness of the first color filter 22α, damage that may be generated due to interference of the spacer 11SP in the portion of the inner face of the array substrate 12 overlapping with the second region AA2 is reduced. Accordingly, the display defect due to damage to the inner face of the array substrate 12 is less likely to be generated at or near the second region AA2. Note that a protruding portion 12BP called a bump is formed at a position of the inner face of the array substrate 12 overlapping with the 2n-th or (2n−1)-th intersection point counted from the end in the X-axis direction in the light blocking portion 23. A plurality of the protruding portions 12BP are disposed at all positions overlapping with the spacer 11SP in a plan view, and are also disposed at positions where the spacer 11SP is not disposed in the second region AA2.

Figure 7:
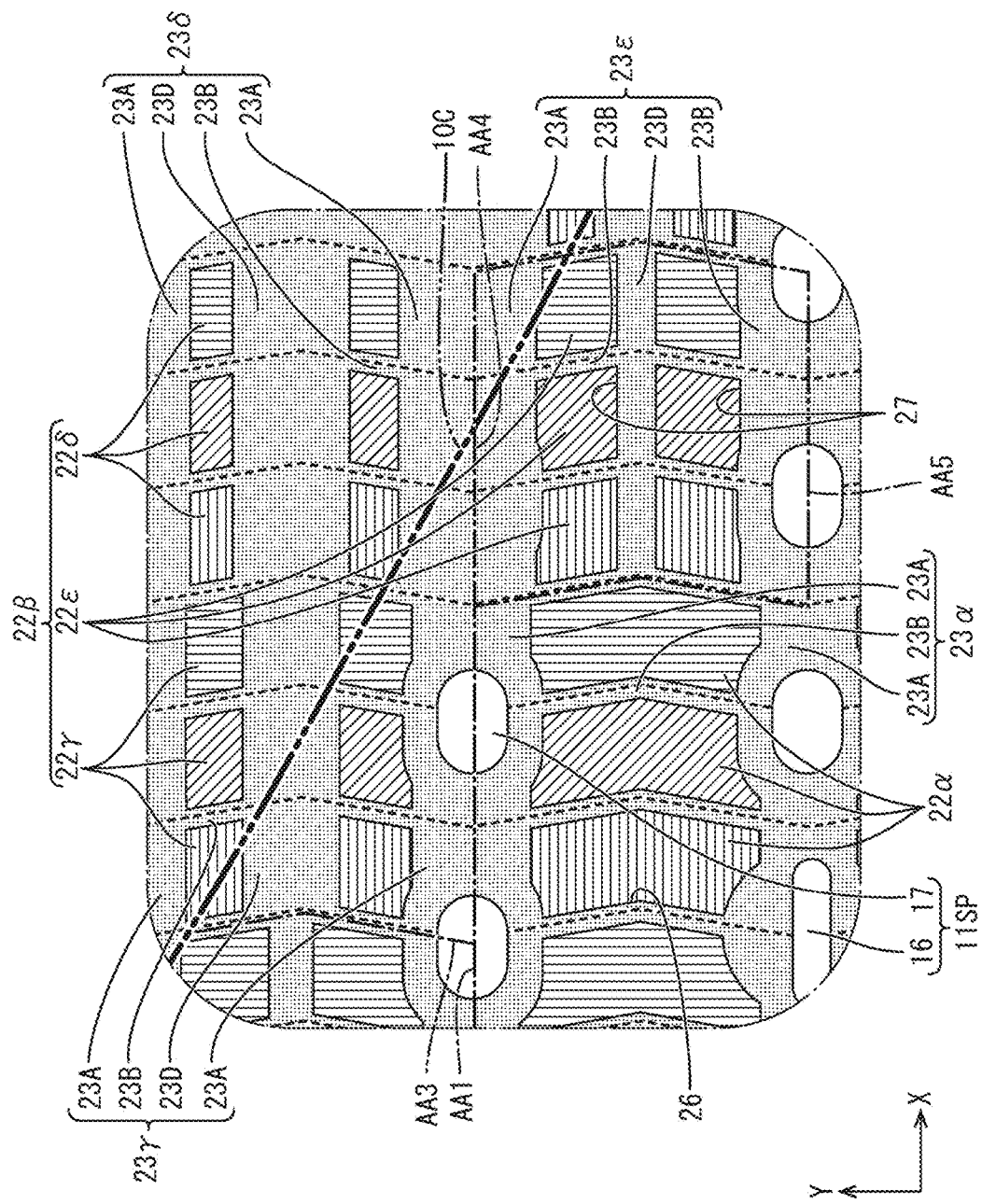
FIG. 7 is an enlarged plan view of a part of FIG. 5.

The distribution of the spacer 11SP in the second region AA2 will be described in detail. First, as illustrated in FIG. 7, the plurality of second color filters 22β includes a plurality of types that are different in the area existing in the display region AA and in the area existing in the non-display region NAA. Specifically, the plurality of second color filters 22β include at least a plurality of third color filters 22γ, a plurality of fourth color filters 22δ, and a plurality of fifth color filters 22ε. Note that in FIG. 7, the non-linear portion 10C is indicated by a thick two dots-dashed line. The plurality of third color filters 22γ have a larger area in the display region AA and a smaller area in the non-display region NAA, as compared with the plurality of fourth color filters 22δ. The plurality of fourth color filters 22δ have a smaller area in the display region AA and a larger area in the non-display region NAA, as compared with the plurality of third color filters 22γ. The plurality of fifth color filters 22ε have a larger area in the display region AA and a smaller area in the non-display region NAA, as compared with the plurality of third color filters 22γ. Thus, a ratio obtained by dividing the area in the display region AA by the area in the non-display region NAA decreases in the order of the plurality of fifth color filters 22ε, the plurality of third color filters 22γ, and the plurality of fourth color filters 22δ. The second region AA2 includes a third region AA3 in which the plurality of third color filters 22γ are disposed, a fourth region AA4 in which the plurality of fourth color filters 22δ are disposed, and a fifth region AA5 in which the plurality of fifth color filters 22ε are disposed. Note that in FIG. 7, lines or the like dividing the third region AA3, the fourth region AA4, and the fifth region AA5 are indicated by thin dot-dashed lines.

As illustrated in FIG. 7, the second light blocking portion 23β includes a third light blocking portion 23γ that partitions the plurality of third color filters 22γ, a fourth light blocking portion 23δ that partitions the plurality of fourth color filters 22δ, and a fifth light blocking portion 23ε that partitions the plurality of fifth color filters 22ε. When the overlapping portions 23D included in the third light blocking portion 23γ, the fourth light blocking portion 23δ, and the fifth light blocking portion 23ε are compared with each other, a width of the overlapping portion 23D of the fifth light blocking portion 23ε is the smallest, and a width of the overlapping portion 23D of the fourth light blocking portion 23δ is the largest. Thus, the overlapping area of the fourth light blocking portion 23δ with respect to each of the plurality of fourth color filters 22δ is larger than the overlapping area of the third light blocking portion 23γ with respect to each of the plurality of third color filters 22γ. Thus, the aperture ratio of the plurality of fourth color filters 22δ is lower than the aperture ratio of the plurality of third color filters 22γ. The overlapping area of the third light blocking portion 23γ with respect to each of the plurality of third color filters 22γ is larger than the overlapping area of the fifth light blocking portion 23ε with respect to each of the plurality of fifth color filters 22ε. Thus, the aperture ratio of the plurality of third color filters 22γ is lower than the aperture ratio of the plurality of fifth color filters 22ε. As described above, as the ratio obtained by dividing the area in the display region AA by the area in the non-display region NAA decreases, the aperture ratio of each of the color filters 22γ, 22δ, and 22ε decreases, and thus the display at or near the non-linear portion 10C can be further smoothed.

As illustrated in FIG. 7, an aperture ratio of the plurality of third color filters 22γ exceeds 35%, the aperture ratio being a ratio of an area not overlapping with the third light blocking portion 23γ to the entire area. Similarly, an aperture ratio of the plurality of fifth color filters 22ε exceeds 35%, the aperture ratio being a ratio of an area not overlapping with the fifth light blocking portion 23ε to the entire area. On the other hand, an aperture ratio of the plurality of fourth color filters 22δ is 35% or less, the aperture ratio being a ratio of an area not overlapping with the fourth light blocking portion 23δ to the entire area. In the third region AA3 and the fifth region AA5, the aperture ratio of both of the plurality of third color filters 22γ and the plurality of fifth color filters 22ε exceeds 35%, and thus a film thickness of each of the plurality of third color filters 22γ and each of the plurality of fifth color filters 22ε is less likely to increase due to the third light blocking portion 23γ, as compared with each of the plurality of fourth color filters 22δ. On the other hand, in the fourth region AA4, the aperture ratio of the plurality of fourth color filters 22δ is 35% or less, and thus a film thickness of each of the plurality of fourth color filters 22δ is likely to increase due to the fourth light blocking portion 23δ as compared with each of the plurality of third color filters 22γ and each of the plurality of fifth color filters 22ε. In view of this, the spacer 11SP according to the present embodiment is selectively disposed so as to exist in the third region AA3 and the fifth region AA5 but not in the fourth region AA4. Thus, the distribution density of the spacers 11SP in the third region AA3 and the fifth region AA5 is lower than the distribution density in the first region AA1 but is higher than the distribution density in the fourth region AA4. No spacer 11SP in the fourth region AA4 allows a situation in which the spacer 11SP interferes with the inner face of the array substrate 12 in the fourth region AA4 to be avoided. This prevents the inner face of the array substrate 12 from being damaged at or near the fourth region AA4. The spacer 11SP in each of the third region AA3 and the fifth region AA5 allows the interval between the counter substrate 11 and the array substrate 12 to be favorably maintained in the third region AA3 and the fifth region AA5. Note that the spacer 11SP is in the third region AA3 and the fifth region AA5, and thus interference of the spacer 11SP with the inner face of the array substrate 12 may be generated, however, the film thickness of each of the plurality of third color filters 22γ and each of the plurality of fifth color filters 22ε is less likely to increase, and thus the damage to the inner face of the array substrate 12 due to the interference of the spacer 11SP is less likely to be generated.

Figure 8:
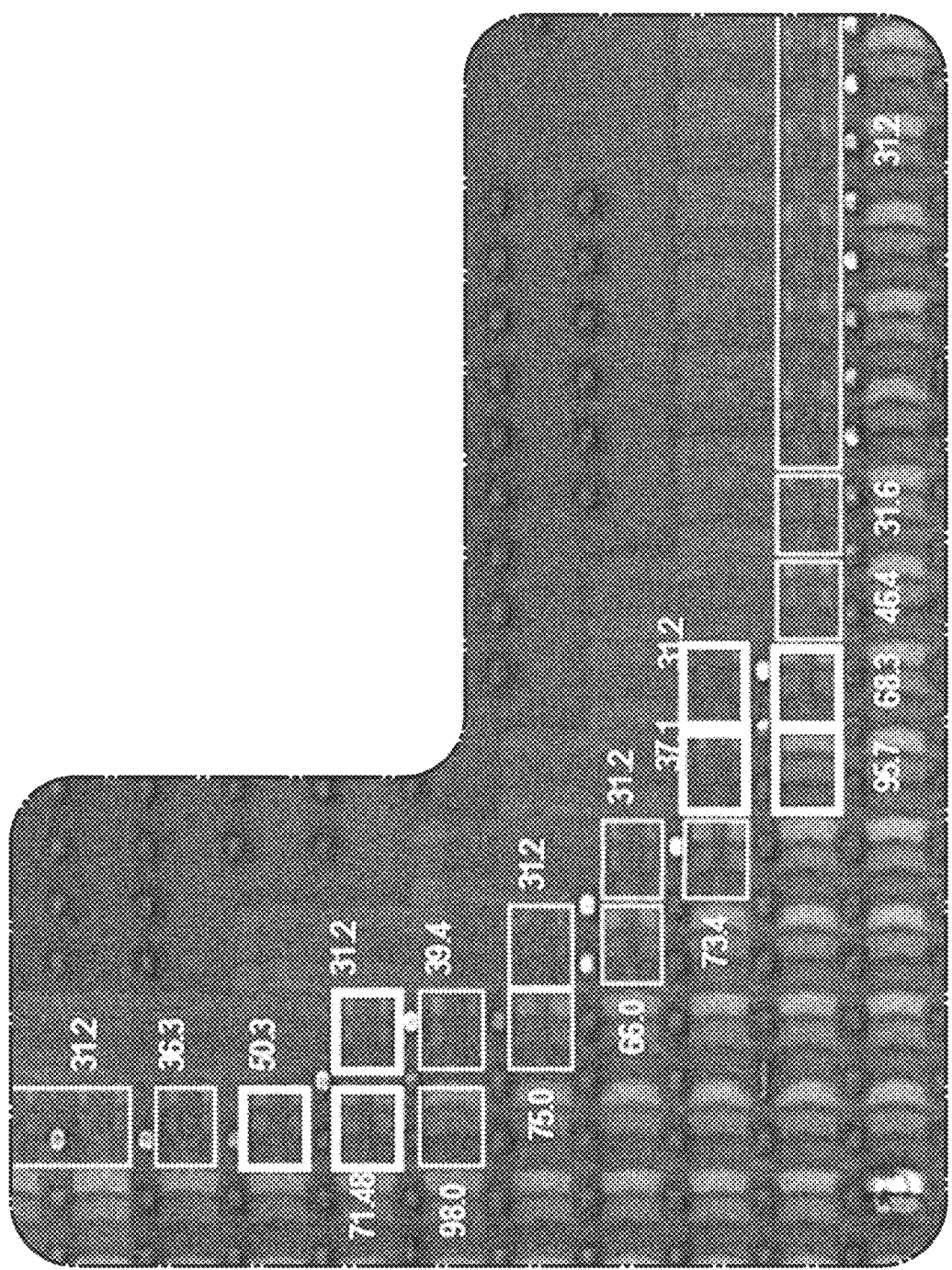
FIG. 8 is a view illustrating an image at or near the non-linear portion imaged in a state in which light is irradiated to the liquid crystal panel subjected to a pressurization test in a verification experiment 1.
Figure 9:
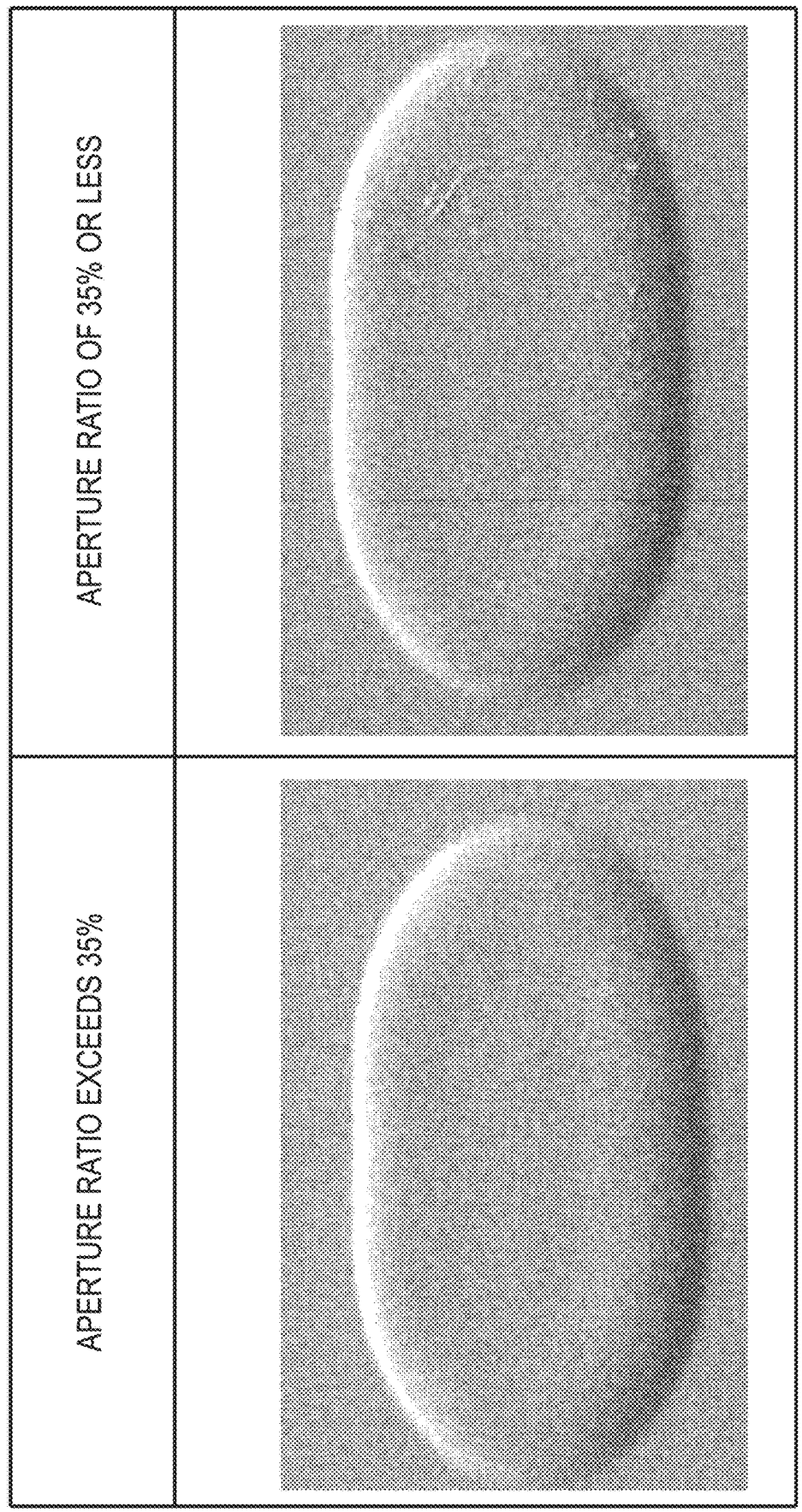
FIG. 9 is a table showing images at or near a spacer adjacent to a color filter having an aperture ratio exceeding 35% and at or near a spacer adjacent to a color filter having an aperture ratio of 35% or less in the verification experiment 1.

Next, the following verification experiment 1 was performed in order to obtain knowledge of the influence of the aperture ratio of the color filters 22 (pixels) on the degree of interference of the spacer 11SP with the inner face of the array substrate 12. In the verification experiment 1, a liquid crystal panel in which the distribution density of the spacer 11SP is uniform in the entire display region AA was produced. The liquid crystal panel according to the verification experiment 1 has the same configuration as that of the liquid crystal panel 10 described before this paragraph except that the distribution density of the spacer 11SP in the first region AA1 is equal to that in the second region AA2. In the liquid crystal panel according to the verification experiment 1, in the entire display region AA, the spacer 11SP is disposed at each intersection point among the intersection points between one first extending portion 23A extending in the X-axis direction and the plurality of second extending portions 23B disposed at intervals in the X-axis direction. In the verification experiment 1, a pressurization test (pressure squeeze test) was performed in which the outer face of such a liquid crystal panel was pressurized for a predetermined time. Then, an image at or near the non-linear portion 10C was imaged in a state in which light was irradiated to the liquid crystal panel subjected to the pressurization test. The imaged image is as illustrated in FIG. 8. In FIG. 8, the brightness (amount of transmitted light) is indicated by gray scale shading, and bright portions (having a large amount of transmitted light) are indicated to be light (whitish) and dark portions (having a small amount of transmitted light) are indicated to be dark (blackish). Note that in FIG. 8, each of the plurality of second color filters 22β is surrounded by a white line square, and each aperture ratio is indicated. Further, in the liquid crystal panel subjected to the pressurization test, each of images at or near the spacer 11SP adjacent to the color filter 22 having the aperture ratio exceeding 35% and at or near the spacer 11SP adjacent to the color filter 22 having an aperture ratio of 35% or less was imaged. The imaged images are as indicated in the table in FIG. 9. On the left side of the table in FIG. 9, an image at or near the sub-spacer 17 adjacent to the color filter 22 having the aperture ratio exceeding 35% is indicated. On the right side of the table in FIG. 9, an image at or near the sub-spacer 17 adjacent to the color filter 22 having the aperture ratio of 35% or less is indicated.

The experimental result of the verification experiment 1 will be described. First, as the pressurization test is performed, the spacer 11SP interferes with the inner face of the array substrate, and thus the alignment film on the inner face of the array substrate may be rubbed to generate shavings. As the amount of the shavings increases, light leakage is more likely to be generated at or near the spacer 11SP, and a bright spot defect locally having large amount of transmitted light tends be likely to be generated. According to FIG. 8, no bright point defect was observed at or near the spacer 11SP adjacent to each of a plurality of first color filters 22α, which are not surrounded by the white line squares in FIG. 8. On the other hand, the bright point defect was observed at or near the spacer 11SP adjacent to each of a plurality of second color filters 22β surrounded by the white line squares in FIG. 8. At or near the spacer 11SP adjacent to each of a plurality of second color filters 22β having the aperture ratio exceeding 35% among the plurality of second color filters 22β, the bright point defect was hardly observed. From this result, it is inferred that the plurality of second color filters 22β having the aperture ratio exceeding 35% do not have a so large film thickness, and thus the damage to the inner face of the array substrate by the spacer 11SP is less likely to be generated even when the pressurization test is performed. On the other hand, many bright point defects were observed at or near the spacer 11SP adjacent to each of the plurality of second color filters 22β having the aperture ratio of 35% or less. From this result, it is inferred that the plurality of second color filters 22β having the aperture ratio of 35% or less have a larger film thickness than that in the case of having the aperture ratio exceeding 35%, and thus the inner face of the array substrate is easily damaged by the spacer 11SP when the pressurization test is performed. According to FIG. 9, in the image at or near the spacer 11SP adjacent to a color filter 22 having the aperture ratio exceeding 35%, the shavings of the alignment film are hardly observed. On the other hand, the image at or near the sub-spacer 17 adjacent to a color filter 22 having the aperture ratio exceeding 35% is rougher than that in the case of having the aperture ratio exceeding 35%, and the shavings of the alignment film are observed.

Based on the above experimental result, even when the spacer 11SP is disposed at or near the color filter 22 having the aperture ratio exceeding 35%, the damage to the inner face of the array substrate due to the interference of the spacer 11SP is less likely to be generated, and thus the spacer 11SP is preferable to be disposed. On the other hand, when the spacer 11SP is disposed at or near the plurality of second color filters 22β having the aperture ratio of 35% or less, the damage to the inner face of the array substrate due to the interference of the spacer 11SP is likely to be generated, and thus the spacer 11SP is preferable not to be disposed.

As described above, the liquid crystal panel (display device) 10 according to the present embodiment includes the counter substrate (first substrate) 11, the array substrate (second substrate) 12 facing the counter substrate 11 with an interval therebetween, a plurality of color filters 22 that are provided on the counter substrate 11 and exhibit different colors, the light blocking portion 23 that is provided on the counter substrate 11, partitions the plurality of color filters 22, overlaps at least with a portion of each of the plurality of color filters 22, and blocks light, and the spacer 11SP that is provided at least on the counter substrate 11 and protrudes from the counter substrate 11 toward the array substrate 12. The main surface of each of the counter substrate 11 and the array substrate 12 is divided into the display region AA and the non-display region NAA, the display region AA being with the plurality of color filters 22 and the light blocking portion 23 disposed and the image being displayed in the display region AA, the non-display region NAA surrounding the display region AA and no image being displayed in the non-display region NAA. The display region AA is the non-linear portion 10C with at least a part of the outer shape being non-linear. The plurality of color filters 22 include the plurality of first color filters 22α not intersecting the non-linear portion 10C and the plurality of second color filters 22β, at least part of the plurality of second color filters 22β intersecting the non-linear portion 10C. The display region AA includes the first region AA1 with the plurality of first color filters 22α disposed and the second region AA2 with the plurality of second color filters 22β disposed. The light blocking portion 23 includes the first light blocking portion 23α that partitions the plurality of first color filters 22α and a second light blocking portion 23β that partitions the plurality of second color filters 22β. The overlapping area of the second light blocking portion 23β with respect to each of the plurality of second color filters 22β is larger than the overlapping area of the first light blocking portion 23α with respect to each of the plurality of first color filters 22α. The distribution density of the spacer 11SP in the second region AA2 is lower than the distribution density of the spacer 11SP in the first region AA1.

Light is transmitted through the plurality of color filters 22 exhibiting different colors, and thus color display is performed. The interval between the counter substrate 11 and the array substrate 12 is maintained by the spacer 11SP interposed therebetween. When the plurality of first color filters 22α not intersecting the non-linear portion 10C included in the outer shape of the display region AA are compared with the plurality of second color filters 22β at least partially intersecting the non-linear portion 10C, the overlapping area of the second light blocking portion 23β with respect to the latter is larger than the overlapping area of the first light blocking portion 23α with respect to the former, and thus the aperture ratio of the latter is lower than the aperture ratio of the former. Thus, the display at or near the non-linear portion 10C can be smoothed.

As described above, when the overlapping area of the second light blocking portion 23β with respect to each second color filter 22β is larger than the overlapping area of the first light blocking portion 23α with respect to each first color filter 22α, the film thickness of the second color filter 22β may be larger than the film thickness of the first color filter 22α. When the spacer 11SP is disposed in the second region AA2, the spacer 11SP is disposed closer to the array substrate 12 than the spacer 11SP disposed in the first region AA1. Thus, in the second region AA2, damage to the inner face of the array substrate 12, which is generated when the spacer 11SP interferes with the inner face of the array substrate 12, tends to increase. On the other hand, in the display region AA, in a case that the distribution density of the spacer 11SP in the second region AA2 is lower than the distribution density of the spacer 11SP in the first region AA1, even when the film thickness of the second color filter 22β is larger than the film thickness of the first color filter 22α, damage that may be generated due to interference of the spacer 11SP in the portion of the inner face of the array substrate 12 overlapping the second region AA2 is reduced. Accordingly, the display defect due to the damage on the inner face of the array substrate 12 is less likely to be generated at or near the second region AA2.

The plurality of second color filters 22β include the plurality of third color filters 22γ and the plurality of fourth color filters 22δ having a smaller area in the display region AA than that of the plurality of third color filters 22γ. The second light blocking portion 23β includes the third light blocking portion 23γ that partitions the plurality of third color filters 22γ and the fourth light blocking portion 23δ that partitions the plurality of fourth color filters 22δ. The overlapping area of the fourth light blocking portion 23δ with respect to each of the plurality of fourth color filters 22δ is larger than the overlapping area of the third light blocking portion 23γ with respect to each of the plurality of third color filters 22γ. The overlapping area of the fourth light blocking portion 23δ with respect to each of the plurality of fourth color filters 22δ is larger than the overlapping area of the third light blocking portion 23γ with respect to each of the plurality of third color filters 22γ, and thus the aperture ratio of the plurality of fourth color filters 22δ is lower than the aperture ratio of the plurality of third color filters 22γ. Thus, the display at or near the non-linear portion 10C can be further smoothed.

The second region AA2 includes the third region AA3 with the plurality of third color filters 22γ disposed and the fourth region AA4 with the plurality of fourth color filters 22δ disposed. The plurality of third color filters 22γ have an area not overlapping with the third light blocking portion 23γ, and the ratio of the area to the total area exceeds 35%. The plurality of fourth color filters 22δ have an area not overlapping with the fourth light blocking portion 23δ, and the ratio of the area to the total area is 35% or less. The spacer 11SP exists in the third region AA3 but not in the fourth region AA4. In the third region AA3, the aperture ratio of the plurality of third color filters 22γ exceeds 35%, and thus the film thickness of each of the plurality of third color filters 22γ is less likely to increase due to the third light blocking portion 23γ as compared with each of the plurality of fourth color filters 22δ. On the other hand, in the fourth region AA4, the aperture ratio of the plurality of fourth color filters 22δ is 35% or less, and thus the film thickness of each of the plurality of fourth color filters 22δ is likely to increase due to the fourth light blocking portion 23δ as compared with each of the plurality of third color filters 22γ. No spacer 11SP in such a fourth region AA4 allows a situation in which the spacer 11SP interferes with the inner face of the array substrate 12 in the fourth region AA4 to be avoided. This prevents the inner face of the array substrate 12 from being damaged at or near the fourth region AA4. The spacer 11SP in the third region AA3 allows the interval between the counter substrate 11 and the array substrate 12 to be favorably maintained in the third region AA3. Note that the spacer 11SP is in the third region AA3, and thus interference of the spacer 11SP with the inner face of the array substrate 12 may be generated, however, the film thickness of each of the plurality of third color filters 22γ is less likely to increase, and thus the damage to the inner face of the array substrate 12 due to the interference of the spacer 11SP is less likely to be generated.

The plurality of color filters 22 are arranged side by side in a first direction along the main surface of the counter substrate 11, and the second light blocking portion 23β includes the overlapping portion 23D overlapping with the center portion of each of the plurality of second color filters 22β in a second direction along the main surface of the counter substrate 11 and orthogonal to the first direction. In the plurality of second color filters 22β, light is blocked by the second light blocking portion 23β including the overlapping portion 23D as described above, and thus an opening portion in which light is not blocked is divided into two. The widths of these two opening portions are reduced as compared with the case where the second light blocking portion 23β is disposed to overlap with both end portions of each second color filter 22β in the second direction. Thus, the film thickness of the second color filter 22β tends to be likely to further increase. In this regard, in a case that the distribution density of the spacer 11SP in the second region AA2 of the display region AA is lower than the distribution density of the spacer 11SP in the first region AA1, even when the film thickness of the second color filter 22β is further increased as described above, damage that may be generated due to interference of the spacer 11SP in the portion of the inner face of the array substrate 12 overlapping the second region AA2 is reduced. Accordingly, the display defect due to the damage on the inner face of the array substrate 12 is less likely to be generated at or near the second region AA2.

OTHER EMBODIMENTS

The techniques disclosed in the present specification are not limited to the embodiments described above and illustrated in the drawings, and the following embodiments, for example, are also included within the technical scope.

(1) The distribution density of the spacer 11SP in the fifth region AA5 may be higher than the distribution density in the third region AA3.

(2) It is also possible that the spacer 11SP is not disposed in the second region AA2. That is, the spacer 11SP need not be disposed in any of the third region AA3, the fourth region AA4, and the fifth region AA5 included in the second region AA2.

(3) The second light blocking portion 23β may include a portion overlapping with both end portions of the second color filter 22β in the Y-axis direction.

(4) The specific shape of the outer shape of the display region AA can be changed to a shape other than the illustrated shape, as appropriate. The ratio between the linear portions 10A and 10B and the non-linear portion 10C included in the outer shape of the display region AA, the specific planar shape of the non-linear portion 10C, and the like can be appropriately changed. The outer shape of the display region AA need not include the linear portions 10A and 10B and may include only the non-linear portion 10C. Specifically, the outer shape of the display region AA may be circular, elliptical, or the like.

(5) Specific pattern of the light blocking portion 23 can be appropriately changed.

(6) The number of colors of the color filter 22 may be four or more. A color filter 22 to be added may be a yellow color filter transmitting yellow light included in a yellow wavelength region (from approximately 570 nm to approximately 600 nm), a white color filter transmitting light of a full wavelength region, or the like.

(7) The counter substrate 11 may be located on the back side, and the array substrate 12 may be located on the front side.

(8) The color filter 22 may be provided in the array substrate 12. In this case, the pixel electrode 19 and the color filter 22 constituting a pixel are both provided on the array substrate 12, and the components of the pixel are not provided on the counter substrate 11.

(9) The light blocking portion 23 may be provided on the array substrate 12.

(10) The counter substrate 11 and the array substrate 12 may be made of a material such as a synthetic resin material other than glass, for example.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A display device comprising:
a first substrate;
a second substrate facing the first substrate with an interval therebetween;
a plurality of color filters provided on the first substrate, the plurality of color filters exhibiting different colors;
a light blocking portion provided on the first substrate, the light blocking portion partitioning the plurality of color filters, overlapping at least with a portion of each of the plurality of color filters, and blocking light; and
a spacer provided at least on the first substrate, the spacer protruding from the first substrate toward the second substrate, wherein
a main surface of each of the first substrate and the second substrate is divided into a display region and a non-display region, the display region being with the plurality of color filters and the light blocking portion disposed and an image being displayed in the display region, the non-display region surrounding the display region and no image being displayed in the non-display region,
the display region is a non-linear portion with at least a part of an outer shape being non-linear,
the plurality of color filters include a plurality of first color filters not intersecting the non-linear portion and a plurality of second color filters, at least part of the plurality of second color filters intersecting the non-linear portion,
the display region includes a first region with the plurality of first color filters disposed, and a second region with the plurality of second color filters disposed,
the light blocking portion includes a first light blocking portion partitioning the plurality of first color filters, and a second light blocking portion partitioning the plurality of second color filters,
an overlapping area of the second light blocking portion with respect to the plurality of second color filters is larger than an overlapping area of the first light blocking portion with respect to the plurality of first color filters, and
a distribution density of the spacer in the second region is lower than a distribution density of the spacer in the first region.

2. The display device according to claim 1,
wherein the plurality of second color filters include a plurality of third color filters and a plurality of fourth color filters having a smaller area in the display region than the plurality of third color filters,
the second light blocking portion includes a third light blocking portion partitioning the plurality of third color filters and a fourth light blocking portion partitioning the plurality of fourth color filters, and
an overlapping area of the fourth light blocking portion with respect to the plurality of fourth color filters is larger than an overlapping area of the third light blocking portion with respect to the plurality of third color filters.

3. The display device according to claim 2,
wherein the second region includes a third region with the plurality of third color filters disposed, and a fourth region with the plurality of fourth color filters disposed,
the plurality of third color filters have an area not overlapping with the third light blocking portion, a ratio of the area to a total area exceeding 35%
the plurality of fourth color filters have an area not overlapping with the fourth light blocking portion, a ratio of the area to a total area being 35% or less, and
the spacer exists in the third region but not in the fourth region.

4. The display device according to claim 1,
wherein the plurality of color filters are arranged side by side in a first direction along the main surface of the first substrate, and
the second light blocking portion includes an overlapping portion overlapping with a center portion of the plurality of second color filters in a second direction along the main surface of the first substrate and orthogonal to the first direction.

* * * * *